United States Patent
Deschenes et al.

(10) Patent No.: US 11,959,770 B2
(45) Date of Patent: Apr. 16, 2024

(54) METHOD AND DEVICE FOR DETERMINING THE RELIABILITY OF A LOW-DEFINITION MAP

(71) Applicant: PSA AUTOMOBILES SA, Poissy (FR)

(72) Inventors: Olivier Deschenes, Malakoff (FR); Alexis Rey, St. Cloud (FR); Pierre Clément Gauthier, Reims (FR); Luc Vivet, Paris (FR); Soumia Nid Bouhou, Casablanca (MA)

(73) Assignee: PSA AUTOMOBILES SA, Poissy (FR)

( * ) Notice: Subject to any disclaimer, the term of this patent is extended or adjusted under 35 U.S.C. 154(b) by 0 days.

(21) Appl. No.: 18/546,505

(22) PCT Filed: Feb. 2, 2022

(86) PCT No.: PCT/FR2022/050190
§ 371 (c)(1),
(2) Date: Aug. 15, 2023

(87) PCT Pub. No.: WO2022/195182
PCT Pub. Date: Sep. 22, 2022

(65) Prior Publication Data
US 2024/0035845 A1 Feb. 1, 2024

(30) Foreign Application Priority Data

Mar. 15, 2021 (FR) ........................................ 2102517

(51) Int. Cl.
*G01C 21/00* (2006.01)
*B60W 60/00* (2020.01)

(52) U.S. Cl.
CPC ....... *G01C 21/3837* (2020.08); *B60W 60/001* (2020.02); *B60W 2552/15* (2020.02); *B60W 2552/30* (2020.02); *B60W 2555/60* (2020.02)

(58) Field of Classification Search
CPC ............ G01C 21/3837; B60W 60/001; B60W 2552/30; B60W 2555/60; B60W 2552/15
See application file for complete search history.

(56) References Cited

U.S. PATENT DOCUMENTS

| | | | |
|---|---|---|---|
| 2004/0122590 A1* | 6/2004 | Ito | G01C 21/3844 701/446 |
| 2007/0299606 A1* | 12/2007 | Fujimoto | B60T 7/22 701/450 |

(Continued)

FOREIGN PATENT DOCUMENTS

| | | |
|---|---|---|
| CN | 111767354 A | 10/2020 |
| EP | 2282170 A2 | 2/2011 |

(Continued)

OTHER PUBLICATIONS

International Search Report corresponding to PCT/FR2022/050190 mailed May 19, 2022.

(Continued)

*Primary Examiner* — Mahmoud S Ismail
*Assistant Examiner* — Gabriel Anfinrud
(74) *Attorney, Agent, or Firm* — Sandberg Phoenix & von Gontard P.C.

(57) ABSTRACT

A method is presented for determining a reliability of a low-definition map to make the activation of at least one driving assistance system of an autonomous vehicle reliable when the autonomous vehicle is traveling on a road and wherein the vehicle comprises a navigation system and a perception system, the navigation system comprising the mapping and providing mapped data, the perception system providing measured data of the vehicle and/or the external (Continued)

environment of the vehicle, the method comprising the steps of: receiving mapped data; receiving measured data; determining a path of the road; calculating a road correlation value; calculating a sign correlation value; determining a reliability indicator, reliable or unreliable.

7 Claims, 2 Drawing Sheets

(56) References Cited

U.S. PATENT DOCUMENTS

2015/0241223 A1* 8/2015 Davidson ........... G01C 21/3837
 701/532
2020/0174476 A1* 6/2020 Hasberg .......... B60W 60/00184

FOREIGN PATENT DOCUMENTS

FR 3082349 A1 12/2019
FR 3090547 A1 6/2020

OTHER PUBLICATIONS

Written Opinion corresponding to PCT/FR2022/050190 mailed May 19, 2022.

* cited by examiner

[Fig. 1]
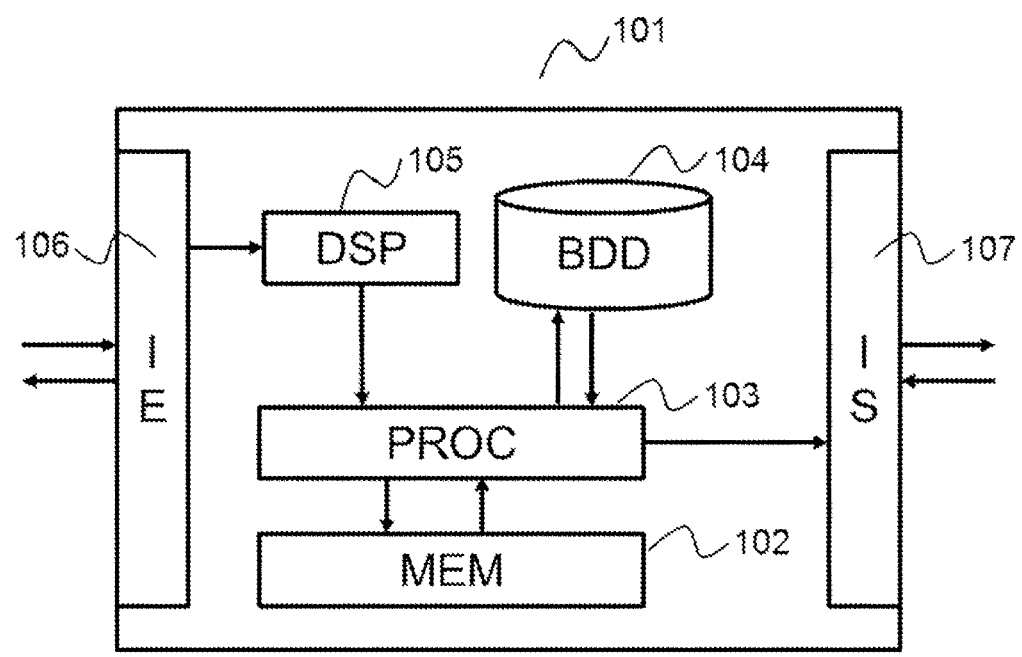

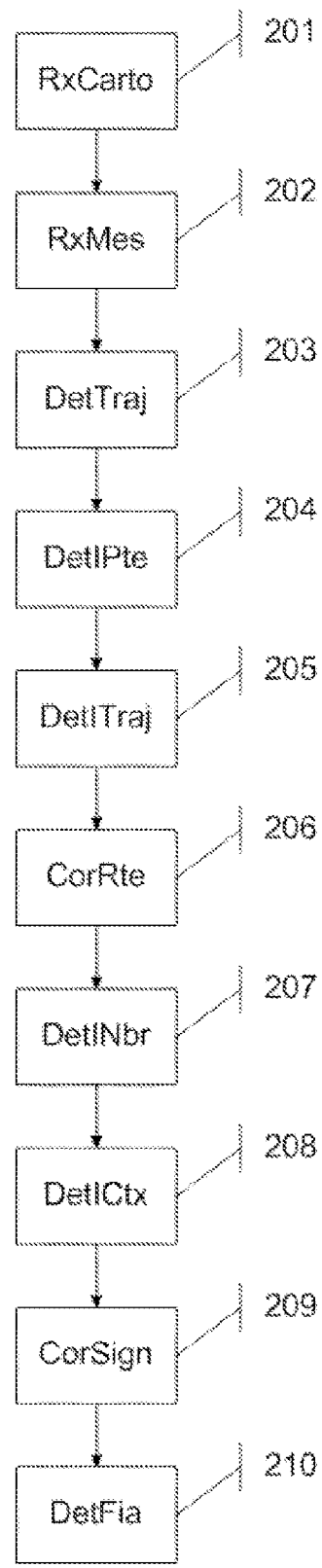
[Fig. 2]

METHOD AND DEVICE FOR DETERMINING THE RELIABILITY OF A LOW-DEFINITION MAP

CROSS-REFERENCE TO RELATED APPLICATIONS

This application is the US National Stage under 35 USC § 371 of International Application No. PCT/FR2022/050190, filed Feb. 2, 2022, which claims the priority of French application 2102517 filed on Mar. 15, 2021, the content (text, drawings and claims) of both said applications being incorporated by reference herein.

BACKGROUND

The devices and methods described herein belong to the field of autonomous vehicle driving assistance systems. In particular, the determination of a reliability of a low-definition map in order to make the activation of at least one assistance system of an autonomous vehicle reliable is described.

"Vehicle" is understood to mean any type of vehicle such as a motor vehicle, a moped, a motorcycle, a storage robot in a warehouse, etc. "Autonomous driving" of an "autonomous vehicle" is understood to mean any method capable of assisting with the driving of the vehicle. The method can thus consist of partially or totally directing the vehicle or of providing any type of assistance to a physical person driving the vehicle. The method thus covers all types of autonomous driving, from level 0 to level 5 in the scale of the International Organization of Motor Vehicle Manufacturers (OICA).

Driver assistance systems are known, for example, lane-keeping assist devices, lane-changing devices, adaptive speed control devices, etc.

A vehicle, comprising one of these devices, comprises numerous sensors such as a camera, a radar, a LIDAR, ultrasound, accelerometers, an inertial unit, position or location sensors, speed sensors, acceleration sensors, etc. Information processing carried out by at least one computer onboard the vehicle which make it able to perceive the environment is also known. The term environment refers to the exterior and interior of the vehicle.

This perception of the environment makes it possible to identify and then recognize road signs, also called signals, characteristics of a road and/or lane, etc.

Also, this perception of the environment makes it possible to measure a slope of a road on which the vehicle is traveling and a determination of a path of the route on which the vehicle is traveling. The determination of the path of the route is for example the determination of the coefficients of at least one polynomial that models the path of the route. For example, the path is cut into several segments or several portions. Each segment or portion is modeled by a polynomial.

Moreover, this vehicle also comprises a navigation system which comprises a means for locating and a map. There are different types of maps. A high-definition map, called HD map, characterizes the lanes and attributes related to the road, such as a number of lanes, road curvatures, road slope, road signs, etc. Moreover, with HD maps, the navigation system, which is connected with servers outside the vehicle by telecommunication links, regularly updates the map. Thus, the road-related attributes are frequently updated. In addition, in HD maps, attributes are well-positioned (1-meter resolution).

In an SD (standard-definition) map, the characterization of the lanes is less precise and the attributes are not always well digitized (lack of positioning, or less precise, on the order of several meters). The map is also less regularly updated. If this update is carried out manually once a year from a database of a map provider, the data are then on average 6 months old.

Due to regular updates and the accuracy of the attributes, an HD map is intrinsically reliable. Thus, it is known that ADAS systems of a vehicle comprising an HD map use information from the map to improve features of these ADAS systems. For example, these features are able to act on the longitudinal and transverse dynamics of the vehicle by activating a driving assistance system (for example modifying a set speed, modifying a positioning of the vehicle in the lane, etc.).

Unfortunately, the cost to embed HD maps is very high compared to the manufacturing cost of a vehicle. If the vehicle has an SD map, it is dangerous to use it as a basis for activations of or modifications to driving assistance systems which act directly on the direction and/or speed of the vehicle. An SD map is not reliable enough.

The document FR3082349 is a driving assistance system mounted on a vehicle. A device for verifying a high-definition map of a motor vehicle is known from document FR3090547. Document CN111767354 discloses a method for evaluating high-precision cartographic precision. A driving assistance system is known from document US 2007/299606. Document EP2282170 discloses a device for specifying the reliability of the information used for driving assistance.

In order for a driving assistance system to use information from mapping, devices that calculate an instantaneous map reliability indicator are known. In particular, the location accuracy given by a GPS (Global Positioning System) device is used. However, these devices that compute an instantaneous map reliability indicator, on the one hand, assume that the information to calculate the indicator is continuously available and, on the other hand, remain conceptual in implementation.

Unfortunately, perception of the environment requires a large volume of information to be processed, and therefore a high load of computations. Thus, in certain cases of use (numerous vehicles around the autonomous vehicle, fast accelerations or decelerations, etc.) or weather conditions, certain perception information is regularly missing or arrives late. Moreover, the perception information coming from image processing is also regularly missing due to the available visibility (for example, a truck may conceal road signage on the side of the lane). Thus, the calculations of an instantaneous reliability indicator of the map when the vehicle is traveling on a road periodically vary abruptly and randomly. The indicator is then unstable, unreliable and unusable, for safety reasons, in driving assistance systems.

SUMMARY

One object is to remedy the aforementioned problem, in particular to make the information more reliable, characteristic of the lane and attributes, coming from an SD map.

To this end, a first aspect relates to a method for determining a reliability of a low-definition map to make the activation of at least one driving assistance system of an autonomous vehicle reliable, said autonomous vehicle traveling on a road and comprising a navigation system and a perception system, the navigation system comprising said map and providing mapped data, the perception system providing measured data of the vehicle and/or the external environment of the vehicle, said method being updated periodically when said vehicle is traveling on a road and comprising the steps of:

Receiving data mapped by the navigation system, the mapped data comprising at least a mapped slope of the road around the vehicle, at least one mapped curvature of the road around the vehicle, and a list of mapped road signs, referred to as a mapped list, the mapped list comprising, for each road sign, a location and contextual information;

Receiving data measured by the perception system, the perception data comprising a measured slope of the road around the vehicle, a measured path of the road around the vehicle, and a list of road signs measured, called a measured list, the measured list comprising, for each road sign, a type, a location, and contextual information;

Determining a path of the road, called a mapped path, from the mapped curvature;

Calculating a road correlation value from the at least one mapped slope, the mapped path, the measured slope, and the measured path, such that the closer the match between the mapped data and the measured data, the greater the correlation value is;

Calculating a sign correlation value from the mapped road sign list and the measured road sign list, such that the closer the match between the mapped data and the measured data, the greater the correlation value is;

Determining a reliability indicator, reliable or unreliable, the indicator being reliable if a combination of the road correlation value and the sign correlation value is greater than a predetermined threshold.

Thus, if there is good reliability, this means that the navigation system positions the vehicle well on the map, and thus that the map is locally reliable (around the vehicle, within the perception distance). A driving assistance system that controls the longitudinal and/or lateral dynamics of the vehicle can rely on data drawn from the map.

Combining the road correlation value with the sign correlation value has the effect of making the determination of the map reliability indicator even more secure. The determination of the map reliability indicator is robust to measurement uncertainties by using the road correlation value and the sign correlation value as a correlation index which takes into account the geometric characteristics of the road and the road signs present on the side of the road.

Indeed, the environment perception sensors like a camera embedded at the top of the vehicle windshield are sensitive to objects present in the environment. For example, if the autonomous vehicle follows a truck, the visibility in front of the vehicle becomes weak and it is then difficult to have a measured path and therefore to have a good match for the computing of the road correlation value. However, visibility on the left or on the right of the truck remains possible, so a road sign is detectable. Then, the determination of the sign correlation value is able to provide a good match between the mapped data and the measured data Advantageously, the road correlation value is a number between 0 and 1, initialized to 0, and wherein the sign correlation value is a number between 0 and 1, initialized to 0.

Advantageously, the method further comprises the steps of:

Determining a slope indicator indicating a match between the mapped slope and the measured slope, the slope indicator being a number between 0 and 1, the value 1 indicating a close match and the value 0 indicating an absence of match, the slope indicator increases or decreases according to a calculated gradient, the gradient being a function of the deviation between the mapped slope and the measured slope;

Determining a path indicator indicating a match between the mapped path and the measured path, the path indicator being a number between 0 and 1, the value 1 indicating a close match and the value 0 indicating an absence of match, the path indicator increases or decreases according to a calculated gradient, the gradient being a function of the lateral deviation between the mapped path and the measured path;

and wherein

The road correlation value is a weighting between the slope indicator and the path indicator.

Using the two indicators makes an update of the road correlation value predictive and reactive. It is predictive by virtue of the path indicator which is based on distant vision of the perception system (between 30 and 300 meters for example). It is reactive by virtue of the slope indicator which is based on vision very close to the vehicle, the measurement of the slope is known only where the vehicle is traveling or has traveled.

By using a gradient, the determination history is taken into account, thus avoiding abrupt variations in the determination of the map's reliability.

Advantageously, the method further comprises a step of:

Determining, from the mapped list and from the measured list, a number indicator indicating a number of road signs that match between the two lists in terms of their type and location; Determining, from the mapped list and the measured list, a contextual indicator indicating a context match between the two lists;

And wherein

The sign correlation value is calculated from the number indicator, the contextual indicator and the previously calculated correlation value, the correlation value increases or decreases by a gradient depending on the number indicator and the contextual indicator;

The use of the number indicator and the contextual indicator makes an update of the correlation value predictive and reactive. It is predictive by virtue of the number indicator which is based on a distant vision of a camera for example (up to 300 meters for example). It is reactive by virtue of the contextual indicator which is based on a vision very close to the vehicle, the recognition of the speed is only known in the immediate environment of the vehicle (between 0 and 10 meters for example).

By using a gradient, the determination history is taken into account, thus avoiding abrupt variations in the determination of the map's reliability.

Advantageously, the reliability indicator is determined, from the road correlation value and the sign correlation value, over at least 4 levels:

A level indicating good reliability of the current speed limit, good reliability of the past speed limit, and good reliability of the road geometry;

A level indicating good reliability of the past speed limit, good reliability of the road geometry, and insufficient reliability of the current speed limit;

A level indicating good reliability of the road geometry, insufficient reliability of the current speed limit, and insufficient reliability of the past speed limit;

A level indicating insufficient reliability of the current speed limit, insufficient reliability of the past speed limit, and insufficient reliability of the road geometry.

Thus, the determination of the map's reliability is robust to the measurement uncertainties by combining the correlation index between geometric characteristics of the road and road signage present in the vicinity of the road.

The reliability indicator is more specific and comprises more nuances and identifies different use cases. This differentiation is useful based on the ADAS functions. For example, an ADAS function on speed regulation needs to know whether there is good reliability of the current or past speed limit. An ADAS function based on emergency braking does not need to know the reliability of the speed limit.

A second aspect relates to a device comprising at least one processor and a memory unit associated with said at least one processor, said at least one processor being configured to implement the method according to the first aspect.

The methods and devices described herein also relate to a vehicle including the device.

The methods and devices described herein also relate to a computer program comprising instructions suitable for executing the steps of the method, according to the first aspect, when said program is executed by at least one processor.

BRIEF DESCRIPTION OF THE FIGURES

Other features and advantages will become apparent from the description of the non-limiting embodiments described below, with reference to the appended figures, in which:

FIG. 1 schematically shows a device.

FIG. 2 schematically shows a method for determining a reliability of a low-definition map.

DETAILED DESCRIPTION

The methods and devices are described below in their non-limiting application to the case of an autonomous motor vehicle circulating on a road or on a traffic lane. Other applications such as a robot in a storage warehouse or a motorcycle on a country road are also conceivable.

FIG. 1 depicts an example of a device 101 comprised in the vehicle, in a network ("cloud") or in a server. This device 101 can be used as a centralized device in charge of at least some steps of the method described below with reference to FIG. 2. In one embodiment, it corresponds to an autonomous driving computer.

The device 101 is comprised in the vehicle.

This device 101 may take the form of a housing comprising printed circuit boards, any type of computer or a mobile telephone (smartphone).

The device 101 comprises a random-access memory 102 for storing instructions for the implementation by a processor 103 of at least one step of the method as described hereinbefore. The device also comprises mass storage 104 for storing data that are intended to be kept after the implementation of the method.

The device 101 may further comprise a digital signal processor (DSP) 105. This DSP 105 receives data for shaping, demodulating and amplifying these data in a manner known per se.

The device 101 also comprises an input interface 106 for receiving the data implemented by the method and an output interface 107 for transmitting the data implemented by the method. In one embodiment, the input interface 106 and the output interface 107 are purely software (API standing for Application Programming Interface, a computing solution that makes it possible to communicate and exchange services and/or data).

FIG. 2 schematically shows a method for determining a reliability of a low-definition map, according to a particular embodiment.

The method is implemented by a device 101 in an autonomous vehicle that comprises at least one driving assistance system. Said autonomous vehicle travels on a road and comprises a navigation system and a perception system.

Said navigation system comprises said map and provides at least one slope and at least one curvature of the road around said vehicle, called mapped slope and mapped curvature. Said perception system provides a slope and a path of the road around said vehicle, called measured slope and measured path.

Each list, the mapped list and measured list, comprises, for each road sign in the list, a type, a location and an item of contextual information.

The term "sign" or "signage" is understood to include but not be limited to, a posted road sign, a light-up signal, a road marker, a road barricade, a boundary marker, and/or lane closure devices. In one embodiment, one type of signage is more precise and comprises, for example, posted road signs, danger signs, signs containing an absolute requirement, signs containing a simple indication or indicating a direction, signs relating to intersections and priority ratings, and/or announcement signs. Also, one type is able to comprise a shape, such as for example for a road sign shape, a triangle, an inverted triangle, a circle, a square, a rectangle, a hexagonal shape, or any other geometric shape. For example, one type is a speed limit sign. Using an on-board camera in the vehicle and an associated image processing, it is known to recognize a type of signage from a distance of 300 meters for example or even more.

Contextual information is understood to mean a meaning, a valuation, an interpretation and/or to give a more precise meaning of a sign recognized by a camera and its associated image processing. For example, without being limiting, an item of contextual information is a number of lights, a speed limit value of a speed limit sign, a mandatory right turn at the next intersection, an identification of the image (car, truck, cyclist, pedestrian, etc.) Using a camera on-board the vehicle and an associated image processing, it is known to recognize the contextual information of a sign from a distance of 10 meters, for example, and often, the recognition information is only available when the vehicle is right by the sign, therefore without early knowledge.

Location refers to a relative distance, longitudinally, laterally and/or heightwise, of the location of the road sign relative to the current position of the vehicle. In a preferred operating mode, a list comprises the locations around the vehicle in a horizon covering, for example, 3,000 meters in front of the vehicle to −500 meters (therefore behind the vehicle). A measured list and a mapped list comprise the same horizon. Thus, the measured list comprises a memory of recent past detections. For example, if, at a time T, a road sign with a speed limit value was identified and located 0 meters from the vehicle, at time T+3 seconds, for a vehicle traveling at 120 km/h, the sign with the speed limit value is located −100 meters away (therefore 100 meters behind the vehicle).

When the vehicle is traveling, said method is updated periodically, for example every 100 ms, but another value is possible. In one embodiment, the update is also done on a detected event or on a request for one of the driving assistance systems.

Step 201, RxCarto, is a step of receiving data mapped by the navigation system, the mapped data comprising at least a mapped slope of the road around the vehicle, at least one mapped curvature of the road around the vehicle, and a list of mapped road signs, referred to as a mapped list, the mapped list comprising, for each road sign, a location and contextual information.

Step 202, RxMes, is a step of receiving data measured by the perception system, the perception data comprising a measured slope of the road around the vehicle, a measured path of the road around the vehicle, and a list of road signs measured, called a measured list, the measured list comprising, for each road sign, a type, a location, and contextual information.

Step 203, DetTraj, is a step of determining a path of the route, called a mapped path, from the mapped curvature.

In a preferred operating mode, the navigation system provides information around the vehicle in a horizon covering, for example, 3,000 meters in front of the vehicle to −500 meters (therefore behind the vehicle). On this horizon, the mapping is cut into segments. Each segment represents a portion of the road on which the vehicle travels. A portion therefore comprises a distance. The at least one mapped curvature corresponds to a curvature per segment as well as the length of the segment. Placed end to end, the set of segments represents the route on which the vehicle travels for a given horizon.

Thus, from the curvatures of each segment, a path of the road, called a mapped path, is determined. This determination is carried out, for example, by the determination of a polynomial calculated from the data of the at least mapped curvature. In another example, this determination is obtained from interpolating the at least one mapped curvature.

Step 204, DetlPte, is a step of determining a slope indicator indicating a match between the mapped slope and the measured slope, the slope indicator being a number between 0 and 1, the value 1 indicating a close match and the value 0 indicating an absence of match, the slope indicator increases or decreases according to a calculated gradient, the gradient being a function of the deviation between the mapped slope and the measured slope.

In one operating mode, if the absolute and/or relative deviation between the mapped slope, the slope provided by the navigation system at the location where the vehicle is traveling, and the measured slope is less than a predetermined threshold, then the slope indicator is 1, otherwise the slope indicator is 0.

In a preferred operating mode, the slope indicator increases or decreases according to a calculated gradient, the gradient being a function of the deviation between the mapped slope and the measured slope. The gradient is a number between −1 and 1. Depending on the deviation, a gradient value is chosen. For example, if the deviation is less than a threshold, the gradient is equal to 0.002, otherwise, the gradient is equal to −0.002. Thus, at each period, the slope indicator is updated by taking into account the history, which ensures robustness to random measurement errors and/or to errors and/or inaccuracies in the map.

In another operating mode, the gradient is also a function of the variation of the measured slope. In the event of high acceleration or deceleration, the measured slope temporarily contains more errors. For example, the gradient is equal to 0.004 if the variation of the slope is less than another predetermined threshold and if the deviation between the mapped slope and the measured slope is less than a predetermined threshold.

Step 205, DetlTraj, is a step of determining a path indicator indicating a match between the mapped path and the measured path, the path indicator being a number between 0 and 1, the value 1 indicating a close match and the value 0 indicating an absence of match, the path indicator increases or decreases according to a calculated gradient, the gradient being a function of the lateral deviation between the mapped path and the measured path.

The gradient is a number between −1 and 1. Depending on the deviation, a gradient value is chosen. For example, if the deviation is less than a threshold, the gradient is equal to 0.002, otherwise, the gradient is equal to −0.002. Thus, at each period, the path indicator is updated by taking into account the history, which ensures robustness to random measurement errors and/or to errors and/or inaccuracies in the map.

In another operating mode, the gradient is a function of a combination of the difference between the mapped path and the measured path for each segment. The more differences there are below a threshold, the higher the gradient is.

Step 206, CorRte, is a step of calculating a road correlation value from the at least one mapped slope, the mapped path, the measured slope, and the measured path, such that the closer the match between the mapped data and the measured data, the greater the correlation value is.

In one operating mode, the road correlation value is a weighting between the slope indicator and the path indicator. For example, the correlation value is equal to 40% of the slope indicator added to 60% of the path indicator. The percentages given are examples; other values are possible. Ideally, the percentage of the slope indicator is less than the path Indicator, the path Indicator being more robust. The percentage may also be a function of other parameters, as on at least one threshold of the variation in the measured slope.

Step 207, DetlNbr, is a step of determining, from the mapped list and from the measured list, a number indicator indicating a number of road signs that match between the two lists in terms of their type and location. The match is a simple comparison between both lists. For example, for each type of signage in the mapped list, it is verified whether a same type of signaling with the same location is present in the measured list. If so, then there is a match and the number indicator increases by a value of 1, the number indicator being initialized at 0 at the beginning of the operating mode.

Since the map data is not very precise (current location error on the order of 2 meters) and since the measurements still contain errors (location on the order of 1 to meters depending on the relative distance of the recognized sign relative to the vehicle), the location of a mapped signaling and a measured signaling is the same if the location difference is less than a predefined threshold. For example, this threshold is 5 meters and/or is variable as a function of the relative distance relative to the vehicle (for example, the further a location is from the vehicle, the greater the threshold is).

In this step, the number indicator is higher when more matches are found. A type match is also robust with respect to errors on an SD map. For example, if locally a speed limit was changed, going from 90 km/h to 80 km/h on national highways, whereas the map is not up-to-date, the type and location match is valid for this signage even if the value of the speed limit is not equal between the measured signage and the mapped signage.

Step 208, DetlCtx, is a step of determining, from the mapped list and from the measured list, a contextual indicator indicating a context match between the two lists.

The contextual indicator can be determined by several methods. For example, one of the methods is to create a Boolean indicator, context match or no context match. There is a context match in text if a sign in the mapped list matches the type, location, and context of a sign from the measured list. A type or context match for a sign means the same value in both lists. A location match means a proximity, a location deviation less than a predetermined or variable threshold depending on the distance relative to the vehicle as described above.

In a preferred operating mode, the context indicator has three values. The context indicator takes a first value, called the current context match, if there is a type, location and context match within a near vicinity of the vehicle. The near vicinity being, for example, a distance of 50 meters around the vehicle, in particular in front of and behind the vehicle. The location match is determined to within a threshold. The first value corresponds to a situation where the road sign is close to the vehicle and therefore easily recognized by the perception device or has been recognized a few times before. In a near vicinity of the vehicle, the detection of the context is very reliable.

In the absence of a determination of a context match present, the context indicator takes a second value, called past context match, if there is a type, location and context match outside the near vicinity of the vehicle. Beyond the near vicinity, if the sign is in front of the vehicle, if a context is recognized (rare case), this recognition is less reliable. If the sign is behind the vehicle, it has been previously recognized going back a certain time and/or distance. This recognition is also less reliable. The second value corresponds to a less reliable context match. In the absence of determination of a past context match, the match indicator takes a third value corresponding to "no context match".

Step 209, CorSign, is a step of calculating a sign correlation value from the mapped road sign list and the measured road sign list, such that the closer the match between the mapped data and the measured data, the greater the correlation value is. For example, the sign correlation value is calculated from the number indicator, the contextual indicator and the previously calculated correlation value, the correlation value increases or decreases by a gradient depending on the number indicator and the contextual indicator. The gradient is a value between −1 and 1, and the correlation value is initialized to 0 and then is bounded between 0 and 1.

Different methods make it possible to calculate the correlation value. In a first example, a numerical value is assigned to the contextual indicator and then depending on the product between the contextual indicator and the number indicator, a gradient value is assigned. For example, the higher the product, the higher the gradient.

In a preferred operating mode, the gradient is determined by a predetermined table depending on the number indicator and the contextual indicator such as, for example, in the table below.

|  |  | Contextual indicator | | |
| --- | --- | --- | --- | --- |
| Gradient value |  | No match | Past match | Current match |
| Number indicator | 0 | −0.001 | 0 | 0.001 |
|  | 1 | −0.001 | 0.001 | 0.002 |
|  | 2 | 0.001 | 0.002 | 0.003 |
|  | >3 | 0.002 | 0.004 | 0.006 |

Thus the gradient is greater when there is a type, location and context match in both lists. Conversely, the gradient is smaller and/or negative when there is little or no match. Advantageously, the greater the number indicator, the higher the gradient. Advantageously, if the contextual indicator indicates a match then the gradient is positive. Advantageously, if the contextual indicator indicates no match then the gradient is negative, unless the number indicator is greater than a predefined threshold, in which case the gradient is positive.

Other rules are also possible in order to determine, at each period, a gradient value according to the matches. For example, if the perception device does not succeed in recognizing the type of sign, the gradient is chosen to be negative.

Step 210, DetFia, is a step of determining a reliability indicator. In one operating mode, this indicator indicates reliable or unreliable, the indicator being reliable if a combination of the road correlation value and the sign correlation value is greater than a predetermined threshold. For example, if a weighting of the road correlation value and the sign correlation value is greater than 0.5, the indicator indicates a reliability of the map. In one operating mode, the weighting is 33% road correlation value and 67% sign correlation value. Other values are possible and their determinations depend, for example, on mapped data and measured data.

In one preferred operating mode, the reliability indicator is determined, from the road correlation value and the sign correlation value, over at least 4 levels:

A level indicating good reliability of the current speed limit, good reliability of the past speed limit, and good reliability of the road geometry. For example, in this case the sign correlation value is greater than a first threshold, 0.66 for example, and the road correlation value is greater than a second threshold, 0.6 for example.

A level indicating good reliability of the past speed limit, good reliability of the road geometry, and insufficient reliability of the current speed limit. For example, in this case the sign correlation value is greater than a third threshold less than the first threshold, 0.33, for example, and the road correlation value is greater than the second threshold.

A level indicating good reliability of the road geometry, insufficient reliability of the current speed limit, and insufficient reliability of the past speed limit. For example, in this case the sign correlation value is less than the third threshold, and the road correlation value is greater than the second threshold.

A level indicating insufficient reliability of the current speed limit, insufficient reliability of the past speed limit, and insufficient reliability of the road geometry. For example, in this case the sign correlation value is less than the third threshold, and the road correlation value is less than the second threshold.

The methods and devices described herein are not limited to the embodiments described above by way of example; it extends to other variants.

For example, numerical values were given in particular for gradients. Other values are possible and depend, for example on the refresh period of the procedure.

The invention claimed is:

1. A method of activating the use of a low-definition map by a driver assistance system of an autonomous vehicle, said low-definition map being assessed for reliability, said autonomous vehicle traveling on a road and comprising a navigation system and a perception system, the navigation system comprising said map and providing mapped data, the perception system providing measured data of the autonomous vehicle and/or the external environment of the autonomous vehicle, said method being updated periodically when said autonomous vehicle is traveling on a road and comprising the steps of:

receiving data mapped by the navigation system, the mapped data comprising at least a mapped slope of the road around the autonomous vehicle, at least one mapped curvature of the road around the autonomous vehicle, and a mapped list comprising a list of mapped road signs, the mapped list further comprising, for each road sign, a location and contextual information;

receiving data measured by the perception system, the perception data comprising a measured slope of the road around the autonomous vehicle, a measured path of the road around the autonomous vehicle, and a measured list comprising a list of road signs measured, the measured list further comprising, for each road sign, a type, a location, and contextual information;

determining a mapped path of the road from the mapped curvature;

calculating a road correlation value from the at least one mapped slope, the mapped path, the measured slope, and the measured path, such that the closer the match between the mapped data and the measured data, the greater the correlation value is;

calculating a sign correlation value from the list of mapped road signs and the measured road sign list, such that the closer the match between the mapped data and the measured data, the greater the correlation value is;

determining a reliability indicator, wherein the reliability indicator is determined, from the road correlation value and the sign correlation value, on at least 4 levels:

a first level indicating good reliability of a current speed limit, good reliability of a past speed limit, and good reliability of the road geometry, said first level defined by the sign correlation value being greater than a first threshold and the road correlation value being greater than a second threshold;

a second level indicating good reliability of the past speed limit, good reliability of the road geometry, and insufficient reliability of the current speed limit, said second level defined by the sign correlation value being greater than a third threshold, said third threshold being less than said first threshold, and the road correlation value being greater than the second threshold;

a third level indicating good reliability of the road geometry, insufficient reliability of the current speed limit, and insufficient reliability of the past speed limit, said third level defined by the sign correlation value being less than the third threshold and the road correlation value being greater than a second threshold;

a fourth level indicating insufficient reliability of the current speed limit, insufficient reliability of the past speed limit, and insufficient reliability of the road geometry, said fourth level defined by the sign correlation value being less than the third threshold and the road correlation value being less than the second threshold;

activating the use of low-definition map by the autonomous driving system if said reliability indicator is determined to be at said first level.

2. The method according to claim 1, wherein the road correlation value is a number between 0 and 1, initialized to 0, and wherein the sign correlation value is a number between 0 and 1, initialized to 0.

3. The method according to claim 1, wherein the method further comprises the steps of determining a slope indicator indicating a match between the mapped slope and the measured slope, the slope indicator being a number between 0 and 1, the value 1 indicating a close match and the value 0 indicating an absence of match, the slope indicator increases or decreases according to a calculated gradient, the gradient being a function of the deviation between the mapped slope and the measured slope;

determining a path indicator indicating a match between the mapped path and the measured path, the path indicator being a number between 0 and 1, the value 1 indicating a close match and the value 0 indicating an absence of match, the path indicator increases or decreases according to a calculated gradient, the gradient being a function of the lateral deviation between the mapped path and the measured path;

and wherein the road correlation value is a weighting between the slope indicator and the path indicator.

4. The method according to claim 1, wherein the method further comprises the steps of determining, from the mapped list and from the measured list, a number indicator indicating a number of road signs that match between the two lists in terms of their type and location;

determining, from the mapped list and the measured list, a contextual indicator indicating a context match between the two lists;

And wherein the sign correlation value is calculated from the number indicator, the contextual indicator and the previously calculated correlation value, the correlation value increases or decreases by a gradient depending on the number indicator and the contextual indicator.

5. A device comprising at least one processor and a memory unit associated with said at least one processor, said at least one processor configured to perform the method according to claim 1.

6. A vehicle comprising the device according to claim 5.

7. A computer program comprising instructions suitable for executing the steps of the method according to claim 1 wherein said program is executed by a device comprising at least one processor and a memory unit associated with said at least one processor.

* * * * *